United States Patent Office 3,316,344
Patented Apr. 25, 1967

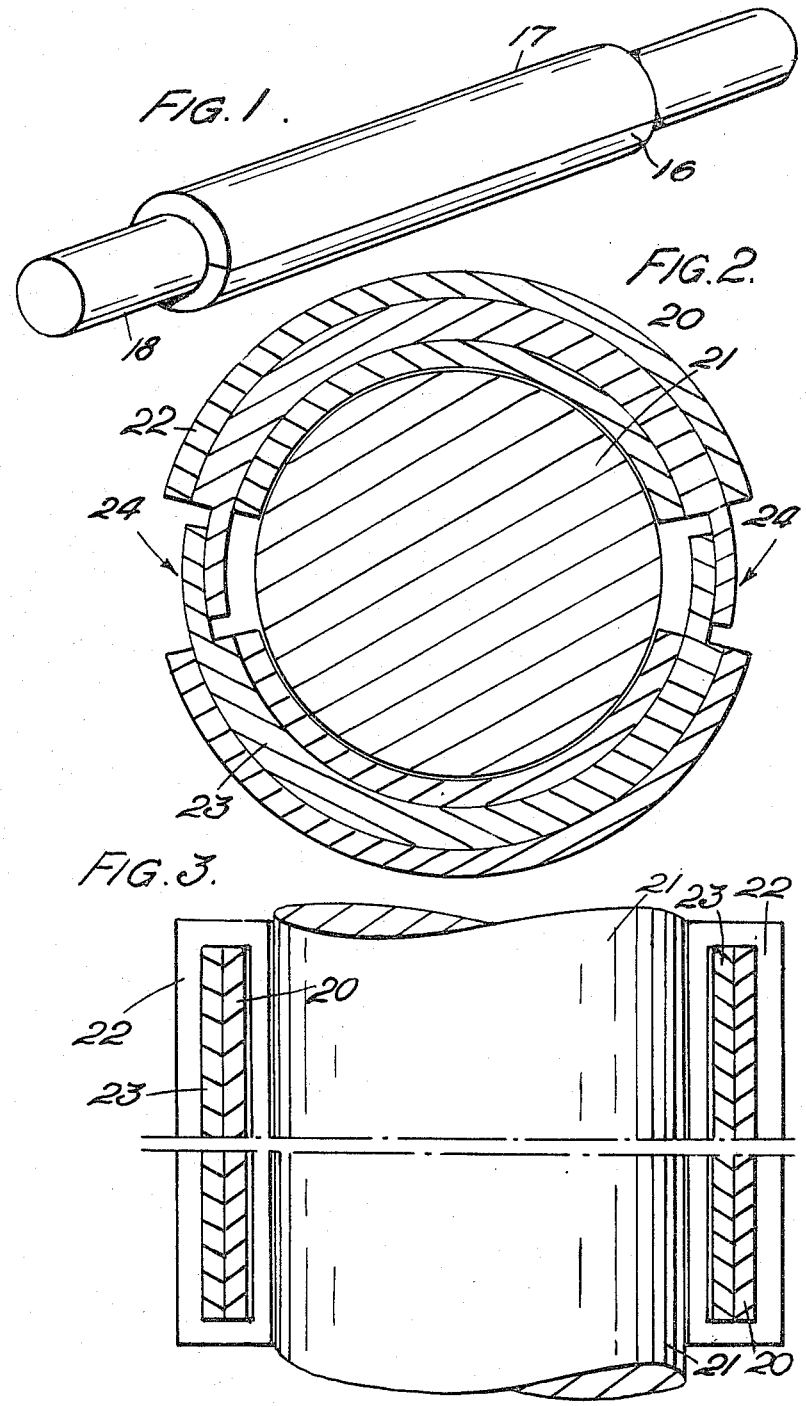

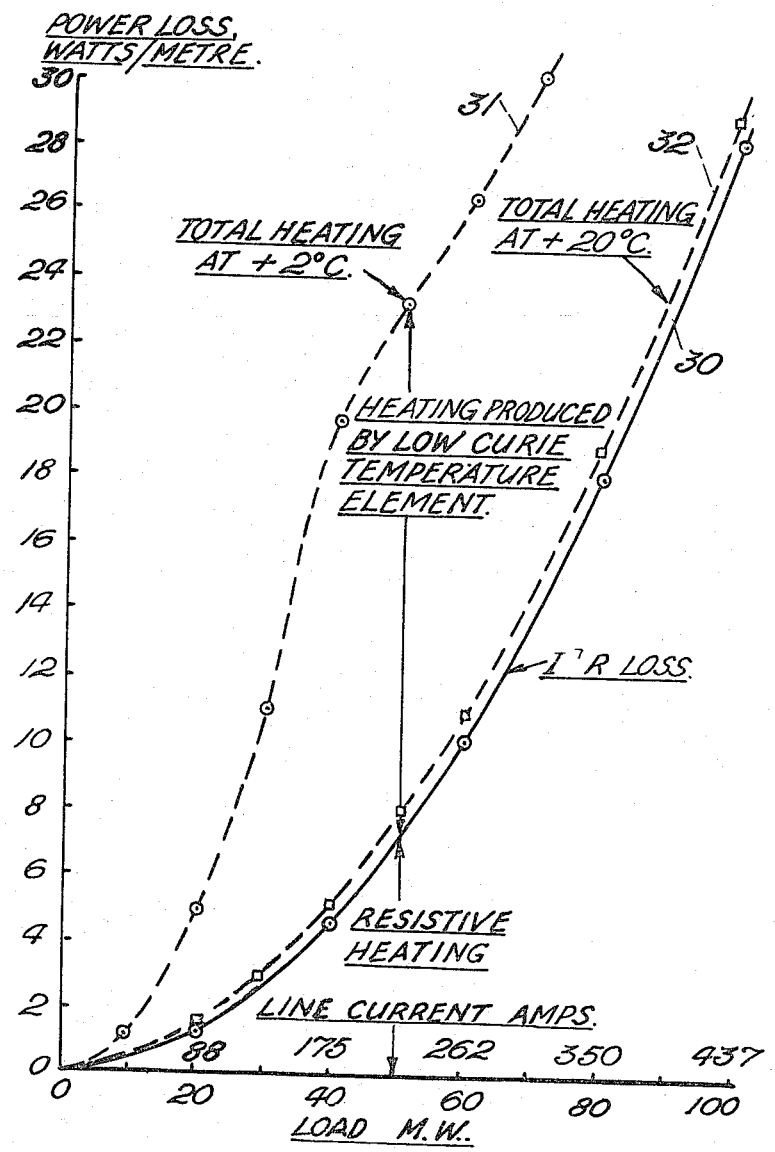

3,316,344
PREVENTION OF ICING OF ELECTRICAL CONDUCTORS
David Alan Kidd, Billericay, Robert Geoffrey Tee, Pudsey, and James Edward Toms, Leeds, England, assignors to Central Electricity Generating Board, London, England, a British body corporate
Filed Apr. 26, 1965, Ser. No. 450,587
23 Claims. (Cl. 174—106)

This invention relates to the prevention of ice formation or the melting of ice on electrical conductors carrying alternating current and is applicable for example to overhead electrical conductors in transmission lines and to other exposed electrical conductors which may be subject to possible ice formation, for example moving or fixed contacts in outdoor substation switching equipment.

According to this invention, an electrical conductor for carrying alternating current is surrounded with a magnetic material having a Curie temperature within the range 0° C. to 20° C. At temperatures above the Curie temperature, the material would be non-magnetic and therefore power losses due to eddy currents and/or magnetic hysteresis arising from the passage of an alternating current through the conductor are very small when the temperature is above the Curie temperature. When the ambient temperature drops below the Curie temperature of the magnetic material, and the temperature of the surface of the conductor assembly falls, the material surrounding the conductor becomes magnetic and hence eddy current and/or magnetic hysteresis losses will increase and so will raise the surface temperature. An equilibrium surface temperature will be reached and, provided this is above 0° C., no ice can form on the conductor assembly.

The magnetic material may be applied as split or solid toroids around the conductor, or the material may be shaped to form a sleeve or a part-sleeve extending around only part of the circumference of the conductor. It is preferable for such a part-sleeve to be completed by a high permeability material to complete the magnetic path with a low reluctance. This construction facilitates the application of the material where required; for example it may be put on the conductor for a short length in the middle of each span between supporting towers. It will be appreciated that since the conductor hangs as a catenary, water will run down the conductor to the lowest point which is the middle of the span if the end points are at the same level and thus ice formation tends to be most serious at the middle of the span. It is generally desirable to minimize additional weight on the conductors and the use of a short element, attachable to the conductor, enables the material to be put on only where necessary.

A further advantage arising from putting the magnetic material around the conductor is that the permeability of the material is very much greater than unity at the Curie temperature but falls off at higher temperatures. At the Curie temperature, the high permeability and leakage fluxes cutting the conductor cause the whole conductor assembly to act as if its permeability was greater than unity with the result that the current flows in the outer part of the assembly due to the well known "skin effect" and the effective resistance to alternating current is substantially greater than the direct current resistance thereby further improving the heating effect.

The magnetic material surrounding the conductor may be a metallic alloy and in this case most of the heating will be due to eddy current losses in the covering. A suitable alloy having a Curie temperature just above 0° C. is a quaternary alloy of nickel, iron, chromium and silicon; one suitable material is an alloy containing 9.14% chromium, 34–38% nickel, 0.5–1.15% silicon and the balance iron. Such a material may be used as a sleeve or part-sleeve.

Alternatively the material may be a ferrite material. Such ferrite material may conveniently be in the form of split or solid toroids or dispersed in a suitable plastic matrix. The Curie temperature of a ferrite can readily be adjusted to the required value. With a ferrite, nearly all the heating effect is due to the magnetic hysteresis loss in the material. Manganese zinc and nickel zinc ferrites have very suitable magnetic properties.

As previously stated, for the present invention, material having a Curie temperature between 0° C. and 20° C. is employed. Preferably the Curie temperature is between 0° C. and 10° C.

The heating produced by hysteresis and/or eddy current loss can also be increased by placing a shorted turn round the ferrite or magnetic alloy so that the device would then operate as a single turn current transformer whose transformation ratio would be temperature sensitive.

It will be seen that the material may readily be applied to exposed conductors in most situations where icing may occur. The heating of the conductors is effected automatically when the surface temperature drops below the Curie point of the material and no external supply circuits or control circuits are required. Power is dissipated only when the temperature has dropped below the Curie point and thus only when it is necessary to start heating the conductor to prevent ice formations.

The invention furthermore includes within its scope, an element for preventing ice formation on an electrical conductor comprising a sleeve or half sleeve of magnetic material having a Curie temperature within the range 0° C. to 20° C. and electrically conductive material around the magnetic material so as to form a shorted secondary turn when the element is put on a conductor carrying alternating current.

In the following description, reference will be made to the accompanying drawings in which:

FIGURE 1 is a perspective veiw of part of a conductor with a magnetic sleeve forming one embodiment of the invention;

FIGURE 2 is a cross-section of a conductor and heating elements incorporating magnetic material and a shorted turn;

FIGURE 3 is a longitudinal section in a plane through the axis of a conductor and heating elements comprising magnetic material and a shorted turn;

FIGURE 4 is a graphical diagram illustrating the relationship between the heating produced and the conductor current for two different temperatures.

Figure 5:
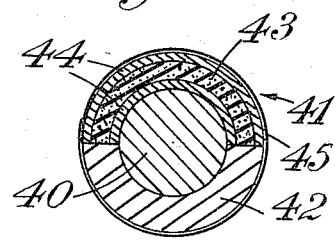
FIGURE 5 is a transverse section through another construction of conductor and heating element.

The accompanying drawings illustrate the conductors diagrammatically. Conductors for bearing currents are usually formed of standard aluminum or copper which is helically arranged around a steel core. The current tends to follow the helical path of the conducting strands and the magnetic flux at any point on the surface is substantially at right angles to the helical path of the conducting strands at that point.

FIGURE 1 illustrates a construction in which magnetic material is put as two half-sleeves 16 and 17 on a conductor 18. This magnetic material has a Curie temperature between 0° C. and 20° C. and preferably between 0° C. and 10° C. Conveniently, a suitable metal alloy is used, e.g. a quaternary alloy of nickel, iron, chromium and silicon having, by percentage weight, 9–14% chromium, 34–38% nickel, 0.5–1.15% silicon and the remainder iron. A typical example has the composition nickel 35.23%, chromium 10.8%, silicon 1.05% and the residue iron. The half sleeves 16, 17 could alternatively however be formed of ferrite material e.g. a manganese zinc or a nickel zinc ferrite. This ferrite material may be formed as a split or solid toroid of solid ferrite material or of ferrite particles dispersed in a plastic matrix. Using the quaternary alloy material, it may typically have a thickness of 0.2 cm. and so can be bent around the conductor.

The heating produced by hysteresis and/or eddy current loss in any of the above constructions can be increased by putting a shorted turn around the magnetic material. This may be done by coating the elements 16, 17 with a material, e.g. aluminum, having a greater conductivity than said magnetic material. The shorted turn need only be quite thin and, in a typical case might be between 0.005 and 0.040 inch thick depending upon the conductor current and magnetic flux density.

FIGURES 2 and 3 illustrate such a construction having a shorted turn of conductive material. In these figures, the magnetic material, e.g. the quaternary alloy, is in the form of a strip 20 pre-formed to fit around the conductor 21. Typically the strip might have a width equal to half the conductor circumference, a length of 18 inches and a thickness of 0.08 inch. An aluminum shorting turn is placed around the length of the magnetic strip in the form of a closed loop of tape or an electro-deposited layer 22 which may be quite thin, e.g. between 0.005 and 0.040 inch thick; in the particular embodiment illustrated where conductor diameter is about 0.78 inch this conductive layer is about 0.08 inch thick and the magnetic material is of the same thickness. The strip might be made of such width that it can fit around the conductor and be clamped to form a tight sleeve extending along the conductor for a length equal to the length of the strip, i.e. 18 inches in the above typical construction. In the construction shown in FIGURES 2 and 3, however the sleeve is pre-formed into two half-sections 20 and 23, each covering half the circumference of the conductor and having "half-lap" joints 24 as seen in FIGURE 3. Shorted aluminum turns are illustrated as being provided around both half-sleeves. In some cases, this shorted turn might be provided only around the uppermost half section thus producing all the heating on the top of the conductor. Double the heating over the top half of the conductor may prevent ice and snow accumulation better than the same total heat dissipated over the entire surface area.

For this reason, the material for the lower half section 23 of the sleeve need not have a low Curie temperature but should preferably have a high permeability and a low density. The lower half-section simply completes the magnetic path with a low reluctance when the upper half-section is in its magnetic state.

Instead of the "half-lap" joints 24, butt joints might be employed as in the construction of FIGURE 1. In that figure also, the lower half-sleeve need not have a low Curie temperature but it should be of high permeability to complete the magnetic circuit. A construction in which butt joints are employed and in which the lower half-sleeve is of high permeability magnetic material is illustrated in FIGURE 5. In that figure, there is shown the conductor 40 with two half-sleeves 41 and 42. The upper half-sleeve 41 is illustrated in this example as being formed of a plastic material 43, typically polyethylene or polyvinyl chloride having ferrite particles embedded therein, the ferrite particles constituting between 20 and 80% by volume of the material. A layer of aluminum 44 forms a shorted turn coupled to the magnetic flux through the material 43, as previously described with reference to FIGURES 2 and 3. The lower half-sleeve 42 is formed of high permeability magnetic material.

The two half sections of FIGURE 1 or of FIGURES 2 and 3 may be held together to form a sleeve around the conductor by means of crimping or binding with wire. Such a binding wire is illustrated at 45 in FIGURE 5. An anti-corrosive insulating layer of, for example, silicone elastomer is preferably put over the aluminum and magnetic materials. The anti-corrosive layer could be a tape wrapping but is preferably a layer applied by painting or spraying. This layer will reduce the ice bond strength and prevent electrolytic corrosion and also insulates the secondary turn from the primary conductor.

FIGURE 4 is a graphical diagram illustrating the power loss (that is the power dissipated as heat) plotted against load in megawatts (or line current in amperes) for a steel-cored aluminum conductor of 0.175 square inch cross-sectional area. The solid line 30 shows the resistive heat loss. The dashed lines 31 and 32 show the total heating at 2° C. and at 20° C. respectively when the conductor has heating elements of the form shown in FIGURES 2 and 3. It will be seen that, at 20° C., the extra heating produced by the low Curie temperature magnetic material is quite small. At 2° C. however, there is very substantial extra heating, even at relatively low power levels. The height of the curve 31 above the curve 30 shows the extra heat produced by the heating element. The system however is self-regulating in that, if the temperature of the magnetic material rises, the power dissipated in heat will fall off and, as is shown by the curve 32, if the temperature of this material reaches 20° C., the power loss is very little more than that due to the resistive loss in the conductor.

We claim:

1. An electrical conductor for carrying alternating current and having an element at least partly surrounding the conductor, which element is formed of magnetic material having a Curie temperature within the range 0° C. to 20° C., the element having a coating of material of higher electrical conductivity than said magnetic material to form a shorted secondary turn linked to the magnetic flux induced in said magnetic material.

2. An electrical conductor as claimed in claim 1, and having an anti-corrosive electrically insulating layer on said element over said coating of material of higher electrical conductivity.

3. An electrical conductor for carrying alternating current, which conductor is surrounded by magnetic material in the form of solid toroids around the conductor, the magnetic material having a Curie temperature within the range of 0° C. to 20° C., said toroids each having a coating of conductive material to form a shorted secondary turn linked to the magnetic flux through the magnetic material.

4. An electrical conductor for carrying alternating current, which conductor is surrounded by magnetic material in the form of split toroids around the conductor at least one part of each toroid being formed of magnetic material having a Curie temperature within the range 0° C. to 20° C., which latter material has an electrically conductive coating to form a shorted secondary turn to increase eddy current losses at low temperatures.

5. An electrical conductor for carrying alternating current, which conductor is surrounded by a sleeve of magnetic material having a Curie temperature within the range 0° C. to 20° C., the magnetic material having a coating of greater electrical conductivity than the magnetic material to form a shorted secondary turn linked to the magnetic flux through the magnetic material, the sleeve with its conductive coating being electrically insulated from said conductor.

6. An electrical conductor for carrying alternating current, wherein a part sleeve is provided around part of the circumference of the conductor, the part sleeve being formed of a magnetic material having a Curie temperature within the range 0° C. to 20° C., said part sleeve having a coating of greater electrical conductivity than the magnetic material to form a shorted turn linked to the magnetic flux induced in said magnetic material.

7. An electrical conductor as claimed in claim 6 wherein a high permeability element is provided to complete with said part sleeve the magnetic path around the conductor.

8. An electrical conductor as claimed in claim 6 wherein said part sleeve extends around the upper part of the conductor.

9. An electrical conductor for carrying alternating current and having magnetic material with a Curie temperature within the range 0° C. to 20° C. at least partially surrounding the conductor, and conductive material arranged around said magnetic material to form a shorted secondary turn.

10. An electrical conductor in combination with a part sleeve of magnetic material having a Curie temperature between 0° C. and 20° C. wherein conductive material is arranged around the magnetic material to form a shorted secondary turn to increase the eddy current losses at low temperatures.

11. An electrical conductor as claimed in claim 10 wherein the magnetic material is a quaternary alloy of nickel, iron, chromium and silicon.

12. An electrical conductor for conducting alternating current comprising an elongated conductor member with a plurality of elements secured on the surface of said conductor member, which elements are formed of a magnetic material having a Curie temperature between 0° C. and 20° C., said elements having a coating of material of higher conductivity than said magnetic material, arranged to form a shorted secondary turn.

13. An electrical conductor as claimed in claim 12 wherein the elements are formed of a quaternary alloy of nickel, iron, chromium and silicon.

14. An electrical conductor as claimed in claim 12 wherein said elements are formed of a magnetic material comprising by percentage weight, 9–14% chromium, 34–38% nickel, 0.5–1.15% silicon and the remainder iron.

15. An electrical conductor as claimed in claim 12 wherein said elements are formed of ferrite material.

16. An electrical conductor as claimed in claim 12 wherein said elements are formed of ferrite material dispersed in a plastic matrix.

17. An electrical conductor as claimed in claim 12 wherein the Curie temperature of the magnetic material is between 0° C. and 10° C.

18. An element for preventing ice formation on an electrical conductor comprising a sleeve of magnetic material having a Curie temperature within the range 0° C. to 20° C. and electrically conductive material around the magnetic material so as to form a shorted secondary turn when the element is put on a conductor carrying alternating current.

19. An element as claimed in claim 18 wherein the magnetic material comprises, by percentage weight, 9–14% chromium, 34–38% nickel, 0.5–1.15% silicon and the remainder iron.

20. An element as claimed in claim 18 wherein said electrically conductive material is a coating of aluminum.

21. An element as claimed in claim 18 having an anti-corrosive insulating layer over the electrically conductive material and magnetic material.

22. An element for preventing ice formation on an electrical conductor comprising a half-sleeve of magnetic material having a Curie temperature within the range 0° C. to 20° C. and electrically conductive material around the magnetic material so as to form a shorted secondary turn when the element is put on a conductor carrying alternating current.

23. An element as claimed in claim 22 having an anti-corrosive insulating layer over the electrically conductive and magnetic material.

References Cited by the Examiner

UNITED STATES PATENTS

| | | | |
|---|---|---|---|
| 2,387,829 | 10/1945 | Burnham et al. | 174—102 X |
| 2,720,604 | 11/1955 | Mitchel et al. | 75—128 X |
| 2,870,311 | 1/1959 | Greenfield et al. | |
| 2,975,339 | 3/1961 | Mitchel et al. | 75—128 X |
| 3,009,047 | 11/1961 | Simmons | 317—133 X |
| 3,218,384 | 11/1965 | Shaw | 174—40 |

FOREIGN PATENTS

| | | |
|---|---|---|
| 738,035 | 7/1943 | Germany. |
| 908,848 | 10/1962 | Great Britain. |

LEWIS H. MYERS, *Primary Examiner.*

H. HUBERFELD, *Assistant Examiner.*